United States Patent [19]

Tawaraya

[11] Patent Number: 4,971,383
[45] Date of Patent: Nov. 20, 1990

[54] COMBINATION SUN VISOR FOR AUTOMOTIVE VEHICLE

[75] Inventor: Makoto Tawaraya, Isehara, Japan

[73] Assignee: Nissan Motor Co., Ltd., Yokohama, Japan

[21] Appl. No.: 430,322

[22] Filed: Nov. 2, 1989

[30] Foreign Application Priority Data

Nov. 28, 1988 [JP] Japan .................. 63-300240

[51] Int. Cl.$^5$ .............................................. B60J 3/00
[52] U.S. Cl. .................................. 296/97.1; 296/97.8
[58] Field of Search ............... 296/97.5, 97.6, 97.8, 296/97.7, 97.9, 97.1

[56] References Cited

U.S. PATENT DOCUMENTS

| 4,195,876 | 4/1980 | Timpero | 296/97.6 |
| 4,363,512 | 12/1982 | Marcus | 296/97.6 |
| 4,836,599 | 6/1989 | Svenson | 296/97.5 |

FOREIGN PATENT DOCUMENTS 53-22431 2/1978 Japan .

Primary Examiner—Robert R. Song
Attorney, Agent, or Firm—Foley & Lardner, Schwartz, Jeffery, Schwaab, Mack, Blumenthal & Evans

[57] ABSTRACT

To improve the usability of the combination sun visor for shading spaces between two right and left main sun visors, the combination sun visor comprises two main sun visors, a rearview mirror support formed with a subvisor housing hollow portion, and two subvisors slidably housed within the subvisor housing hollow portion. In use, when the main sun visors are pivoted down to their working positions, the subvisors are simply pulled out of the mirror support. Further, when completely slid out of the mirror support, the subvisors are pivotable for adjustment. Further, a mirror is preferably attached to the rear surface of the subvisor so as to be usable as a vanity mirror or an auxiliary rearview mirror.

7 Claims, 2 Drawing Sheets

COMBINATION SUN VISOR FOR AUTOMOTIVE VEHICLE

BACKGROUND OF THE INVENTION

1. Field of the Invention

The present invention relates generally to a combination sun visor for an automotive vehicle, and more specifically to a sun visor having subvisors for shading spaces between two main sun visors.

2. Description of the Prior Art

A combination sun visor having an auxiliary sun visor for covering a space between two right and left main sun visors has been proposed by the same applicant, for instance, in Japanese Published Unexamined (Kokai) Utility Model Appli. No. 53-22431. This document discloses a combination sun visor for an automotive vehicle which comprises a pair of right and left main sun visors and a single auxiliary sun visor bendably or foldably attached to an end of one of the two main sun visors. In use, the two main sun visors are pivoted down to their workable positions at which the sun visor surface is placed parallel to the front windshield, respectively. In addition, an end of the auxiliary sun visor is removed from an end of one of the two main sun visors and then attached to an end of the other of the two main sun visors in order to cover a space between the two main sun visors. In this operation, the auxiliary sun visor extends through the space between the front windshield and the rearview mirror.

In the prior-art combination sun visor including an auxiliary sun visor, however, when the space between the two main sun visors is required to be shaded, since the auxiliary sun visor must be spread between the two main sun visors by placing the auxiliary sun visor on the front side of the rearview mirror, there exists a problem in that it is troublesome to use or spread the auxiliary sun visor, and therefore, the auxiliary sun visor is seldom used.

SUMMARY OF THE INVENTION

With these problems in mind, therefore, it is the primary object of the present invention to provide a combination sun visor for an automotive vehicle by which a space between the two main sun visors can be shaded with subvisors by a simple operation to facilitate the use of the combination sun visor.

To achieve the above-mentioned object, a combination sun visor for an automotive vehicle, according to the present invention comprises: (a) a pair of main sun visors pivotally disposed on both sides of a vehicle front roof; (b) a mirror support disposed between the pair of said main sun visors, for adjustably supporting a rearview mirror, said mirror support being formed with a subvisor housing hollow portion; and (c) a pair of subvisors slidably housed within the subvisor housing hollow portion, for shading spaces between said mirror support and said main sun visors when said subvisors are slid out of said mirror support.

Each subvisor comprises a slider member slidably supported within the subvisor housing hollow portion; and a subvisor member engaged with the slider member in pin-and-groove engagement relationship so as to be pivotal when the subvisor member is slid out of the subvisor housing hollow portion. Further, each subvisor further comprises a mirror on the rear surface thereof, which is usable as a vanity mirror or an auxiliary rearview mirror.

In the combination sun visor for an automotive vehicle according to the present invention, it is possible to shade the spaces between the mirror support and the two main sun visors, respectively, by simply pulling the two slidable subvisors from the mirror support Further, the pulled-out subvisor can be pivoted for adjustment. Further, the mirror attached on the rear surface of the subvisor is usable as a vanity mirror or an auxiliary rearview mirror, thus improving the availability of the combination sun visor.

DETAILED DESCRIPTION OF THE PREFERRED EMBODIMENTS

Figure 1:
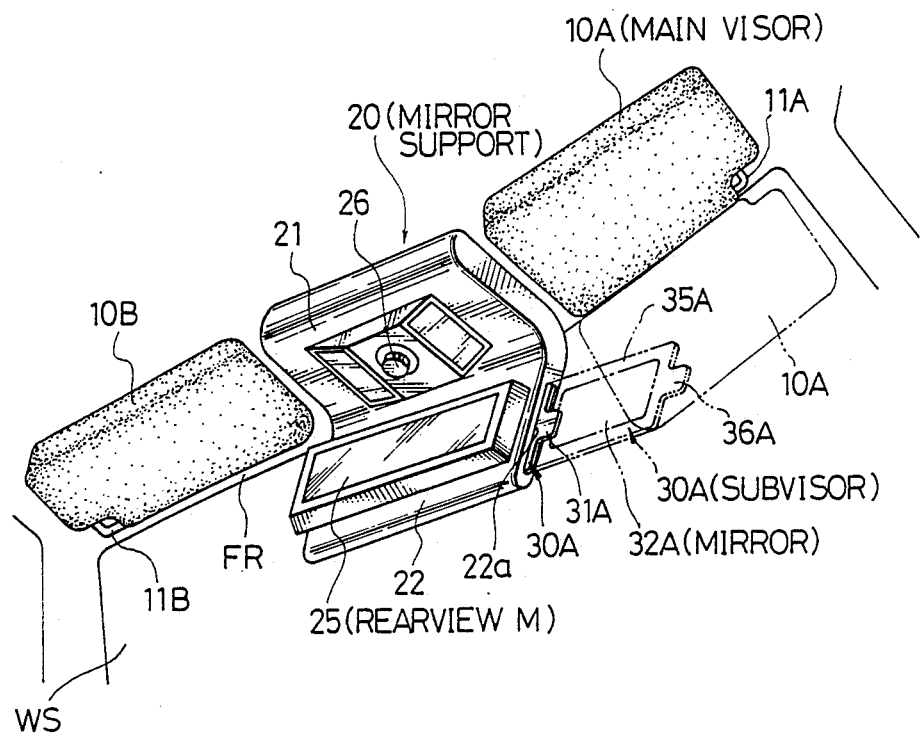
FIG. 1 is a perspective view showing an embodiment of the combination sun visor according to the present invention when seen from the inside of the passenger compartment.

An embodiment of the present invention will be described in detail with reference to the attached drawings. In FIG. 1 the combination sun visor for an automotive vehicle according to the present invention comprises right and left main sun visors 10A and 10B, and a rearview mirror support 20 disposed between the two main sun visors 10A and 10B for adjustably supporting a rearview mirror 25, and a pair of right and left pivotal subvisors 30A and 30B slidably housed within the rearview mirror support 20.

The main sun visor 10A or 10B is supported by a pivotal shaft 11A or 11B so as to be pivotable from an upper position at which the sun visor surface is placed parallel to the vehicle front roof FR (as shown by solid lines in FIG. 1) to a lower working position at which the sun visor surface is placed parallel to the vehicle front windshield WS (as shown by dot-dot-dashed lines in FIG. 1), or vice versa.

The rearview mirror support 20 is L-shape in cross section and is formed integral with a base portion 21 and a rearview mirror holder portion 22. The rearview mirror support 20 is fixed between the two main sun visors 10A and 10B by fastening the base portion 21 to the vehicle front roof FR. The rearview mirror 25 is adjustably and movably supported via a ball point (not shown) on the rearview mirror holder portion 22 so that the mirror angle can be adjusted by the driver. A map lamp 26 is also movably supported via another ball joint (not shown) on the base portion 21 of the rearview mirror support 20.

Figure 2:
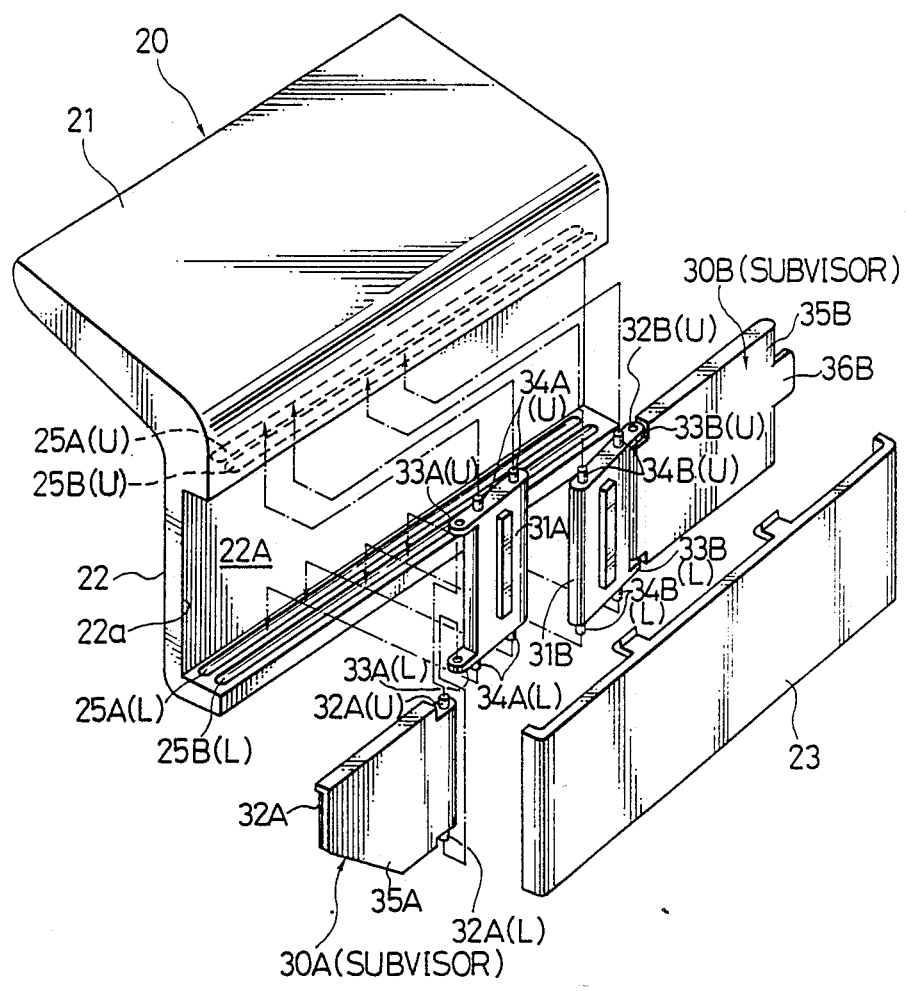
FIG. 2 is a partial exploded view showing an essential portion of the subvisors according to the present invention when seen from the front side of the vehicle.

As shown in FIG. 2, the feature of the present invention is to form a recessed portion 22A on the front side of the rearview mirror holder portion 22 in order to form a subvisor housing hollow portion 22a, in cooperation with a removable front wall 23 of the rearview mirror support 20, into which the two right and left subvisors 30A and 30B are slidably housed. In more detail, two upper guide grooves 25A(U) and 25B(U) (whose both ends are closed) are formed in the upper inner wall surface of the recessed portion 22A of the mirror holder portion 22. Similarly, two lower guide grooves 25A(L) and 25B(L) whose both ends are closed) are formed in the lower inner wall surface of the same recessed portion 22A.

On the other hand, the subvisor 30A or 30B comprises a subvisor member 35A or 35B and a slider member 31A or 31B. The subvisor member 35A or 35B is pivotally connected to the slider member 31A or 31B by inserting two upper and lower pins 32A(U) and 32A(L) or 32B(U) and 32B(L) into two upper and lower bearing portions 33A(U) and 33A(L) or 33B(U) and 33B(L) formed at the upper and lower projections of the slider member 31A or 31B.

Further, two upper slider pins 34A(U) are attached to the upper side surface of the slider member 31A at an interval, and are engaged with the upper guide groove 25A(U) formed on the upper inner wall surface of the mirror holder portion 22. Two lower slider pins 34A(L) are attached to the lower side surface of the slider member 31A at an interval, and are engaged with the lower guide groove 25A(L). In the same way, two upper slider pins 34B(U) are attached to the upper side surface of the slider member 31B at an interval, and engaged with the upper guide groove 25B(U). Two lower slider pins 34B(L) are attached to the lower side surface of the slider member 31B at an interval, and are engaged with the lower guide groove 25B(L).

Further, the two slider members 31A and 31B are both slidable along the upper and lower guide grooves 25A(U), 25B(U) and 25A(L), 25B(L). In addition, the two subvisor members 35A and 35B are both pivotal relative to the respective slider members 31A and 31B when the two slider members are completely slid out of the subvisor housing hollow portion 22a of the rearview mirror support 20.

Further, a mirror 32A or 32B (FIG. 1) is attached to the rear surface of the subvisor member 35A or 35B so as to be usable as a vanity mirror or an auxiliary rearview mirror for the driver's or passenger's convenience.

In use of the combination sun visor, the main sun visor 10A or 10B is pivoted down about the pivotal shaft 11A or 11B from the position shown by solid lines in FIG. 1 to the working position shown by dot-dot-dashed lines in FIG. 1. In this case, if the main sun visor 10A or 10B is pivoted down roughly in parallel to the flat surface of the rearview mirror holder portion 22 of the mirror support 20, it is unnecessary to use the subvisor 30A or 30B, since the horizontal length of the main sun visor 10A or 10B is set so that the inside end of the sun visor 10A or 10B is placed near the outside end of the mirror support 20.

However, if the main sun visor 10A or 10B is pivoted beyond the rearview mirror holder portion 22 as shown by dot-dot-dashed lines in FIG. 1, a space is inevitably formed between the mirror support 20 and the main sun visor 10A or 10B. In this case, the above space can be shaded by sliding the subvisor 30A or 30B out of the subvisor housing hollow portion 22a of the rearview mirror support 20. In more detail, the driver grips the subvisor end knob 36A or 36B and slides the subvisor 30A or 30B from the mirror support 20. When the subvisor 30A or 30B is slid along the guide grooves 25, the outer pins 34A(U) and 34A(L) or 34B(U) and 34B(L) are brought into contact with the closed ends of the grooves 25, since the pivotal portion between the slider member 31A or 31B and the subvisor member 35A or 35B can be fully exposed out of the subvisor housing hollow portion 22a. It is thus possible to adjustably pivot the subvisor member 35A or 35B relative to the slider member 31A or 31B, so that the space formed between the mirror support 20 and the main sun visor 10A or 10B can be adjustably shaded by pivoting the subvisor member 35A or 35B in the front and rear directions. The above-mentioned pivotal subvisor 30A or 30B is particularly effective when the length of the main sun visor 10A or 10B is relatively short.

In addition, since a mirror 32A or 32B is attached to the rear surface of the subvisor member 35A or 35B, it is possible to use this mirror 32A or 32B as a vanity mirror or an auxiliary rearview mirror (when the subvisor is not used for its original purpose) by pulling and pivoting the subvisor 30A or 30B. When the mirror 32A or 32B is used as a rearview mirror, it is possible to increase the effective length of the rearview mirror to improve the rearview recognizability.

As described above, in the combination sun visor for an automotive vehicle according to the present invention, since the mirror support is formed with a subvisor housing hollow portion therewithin, and since two right and left pivotal subvisors are housed within the mirror support, when the subvisors are slid from the mirror support and adjustably pivoted relative to the mirror support, it is possible to effectively shade the spaces between the mirror support and the two main sun visors pivoted to the usable positions via a simple operation. Further, since a mirror is attached to the rear surface of the subvisor, it is possible to use the subvisor mirror as a vanity mirror or an auxiliary rearview mirror where necessary.

In addition, since the subvisors can be housed within the mirror support, when unnecessary, it is possible to improve the outward appearance of the combination sun visor.

What is claimed is:

1. A combination sun visor for an automotive vehicle comprising:
   (a) a pair of main sun visors pivotally disposed on both sides of a vehicle front roof;
   (b) a mirror support disposed between said pair of main sun visors, for adjustably supporting a rearview mirror, said mirror support being formed with a subvisor housing hollow portion; and
   (c) a pair of subvisors slidably housed within the subvisor housing hollow portion, for shading spaces between said mirror support and said main sun visors when said subvisors are slid out of said mirror support.

2. The combination sun visor for an automotive vehicle of claim 1, wherein each of said subvisors comprises
   (i) a slider member slidably supported within the subvisor housing hollow portion; and
   (ii) a subvisor member engaged with said slide member so as to be pivotal for adjustment when said subvisor member is slid out of the subvisor housing hollow portion.

3. The combination sun visor for an automotive vehicle of claim 1, wherein said subvisors are slidably housed within the subvisor housing hollow portion in pin-and-groove engagement relationships.

4. The combination sun visor for an automotive vehicle of claim 1, wherein said subvisor further comprises a mirror disposed on a rear surface thereof and usable as a vanity mirror.

5. The combination sun visor for an automotive vehicle of claim 1, wherein said subvisor further comprises a mirror disposed on a rear surface thereof and usable as an auxiliary rearview mirror.

6. A combination sun visor for an automotive vehicle comprising:
   (A) a vehicle front roof;

(B) a pair of main visors pivotally disposed on opposite sides of said vehicle front roof;

(C) a rearview mirror;

(D) support means, located between said main sun visors, for supporting said rearview mirror, said support means having a hollow portion located therein; and (E) a pair of subvisor means, slidably housed within said hollow portion and at least partially slidable out of said hollow portion, for shading spaces between said support means and said main sun visors when said subvisor means are slid out of said support means.

7. The combination sun visor of claim 6, wherein each of said subvisor means comprises:

(i) a slider member slidably supported within said hollow portion; and (ii) a subvisor member engaged with said slider member so as to be pivotable for adjustment when said subvisor member is slid out of said hollow portion.

* * * * *